(12) United States Patent
Esseghir et al.

(10) Patent No.: US 9,196,412 B2
(45) Date of Patent: Nov. 24, 2015

(54) INSULATION FORMULATIONS

(75) Inventors: Mohamed Esseghir, Lawrenceville, NJ (US); William J. Harris, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 232 days.

(21) Appl. No.: 14/115,767

(22) PCT Filed: Apr. 13, 2012

(86) PCT No.: PCT/US2012/033424
§ 371 (c)(1),
(2), (4) Date: Nov. 5, 2013

(87) PCT Pub. No.: WO2012/158292
PCT Pub. Date: Nov. 22, 2012

(65) Prior Publication Data
US 2014/0125439 A1    May 8, 2014

Related U.S. Application Data

(60) Provisional application No. 61/485,843, filed on May 13, 2011.

(51) Int. Cl.
| | |
|---|---|
| *C08L 63/00* | (2006.01) |
| *H01B 3/00* | (2006.01) |
| *H01F 27/08* | (2006.01) |
| *H01F 27/22* | (2006.01) |
| *C08G 59/42* | (2006.01) |
| *C08G 59/68* | (2006.01) |
| *H01B 3/40* | (2006.01) |
| *H01B 19/04* | (2006.01) |
| *C08K 9/06* | (2006.01) |

(52) U.S. Cl.
CPC ............ *H01F 27/22* (2013.01); *C08G 59/42* (2013.01); *C08G 59/686* (2013.01); *C08L 63/00* (2013.01); *H01B 3/40* (2013.01); *H01B 19/04* (2013.01); *C08K 9/06* (2013.01)

(58) Field of Classification Search
CPC .................................................. C08L 63/00
USPC ..................... 523/400; 336/61; 174/137 B
See application file for complete search history.

(56) References Cited

U.S. PATENT DOCUMENTS

| | | | | |
|---|---|---|---|---|
| 4,358,552 A * | 11/1982 | Shinohara | ............. | C08K 3/34 257/E23.121 |
| 4,751,146 A * | 6/1988 | Maeda | ............. | H05K 1/0326 428/209 |
| 5,106,947 A * | 4/1992 | Maurer | ............. | C08G 59/24 528/361 |
| 5,189,080 A * | 2/1993 | Heyke | ............. | C08G 59/24 523/212 |
| 5,198,479 A * | 3/1993 | Shiobara | ............. | C08G 59/4215 257/E25.032 |
| 5,475,040 A * | 12/1995 | Jamison | ............. | C08K 3/0033 523/513 |
| 5,552,459 A * | 9/1996 | Baumann | ............. | C08G 59/42 523/427 |
| 5,729,423 A * | 3/1998 | Donde | ............. | H01L 21/6831 361/234 |
| 6,087,203 A * | 7/2000 | Eng | ............. | H01L 21/56 257/E21.502 |
| 6,415,104 B1 * | 7/2002 | Fitts | ............. | C08L 9/00 219/544 |
| 2004/0029511 A1 * | 2/2004 | Kincaid | ............. | C08F 283/10 451/526 |
| 2006/0084727 A1 * | 4/2006 | Yan | ............. | C08G 59/226 523/444 |
| 2006/0247339 A1 * | 11/2006 | Harashina | ............. | C08K 5/0066 524/100 |
| 2006/0249705 A1 * | 11/2006 | Wang | ............. | A61L 29/18 252/62.51 C |
| 2010/0100116 A1 * | 4/2010 | Brister | ............. | A61F 5/003 606/192 |
| 2012/0232576 A1 * | 9/2012 | Brister | ............. | A61F 5/0013 606/192 |
| 2013/0066320 A1 * | 3/2013 | Jarman-Smith | ............. | A61L 31/022 606/67 |
| 2014/0075795 A1 * | 3/2014 | Carrier | ............. | A47C 5/12 40/584 |
| 2014/0079953 A1 * | 3/2014 | Esseghir | ............. | C08G 59/226 428/413 |
| 2014/0227548 A1 * | 8/2014 | Myrick | ............. | C06B 45/30 428/570 |
| 2014/0272328 A1 * | 9/2014 | Forney | ............. | C08G 59/42 428/195.1 |
| 2015/0062785 A1 * | 3/2015 | Mills | ............. | H02B 1/056 361/622 |

OTHER PUBLICATIONS

Journal of Applied Polymer Science, 1981, 26, 2211.

* cited by examiner

*Primary Examiner* — Megan McCulley

(57) ABSTRACT

A curable epoxy resin formulation composition useful as insulation for an electrical apparatus including (a) at least one liquid epoxy resin; (b) at least one liquid cyclic anhydride hardener; (c) at least one thermally conducting and electrically insulating filler, wherein the filler includes an epoxysilane treated filler; and (d) at least one cure catalyst with no amine hydrogens; wherein the epoxy resin formulation composition upon curing provides a cured product with a requisite balance of electrical, mechanical, and thermal properties such as Tg, tensile strength, dielectric strength, and volume resistivity such that the cured product can be used in applications operated at a temperature of greater than or equal to 120° C.

15 Claims, No Drawings

INSULATION FORMULATIONS

CROSS REFERENCE TO RELATED APPLICATIONS

This is a §371 application of PCT International Patent Application Number PCT/US2012/033424 filed 13 Apr. 2012, and claims priority from provisional application Ser. No. 61/485,843 filed 13 May 2011, each of which is incorporated herein by reference in its entirety.

BACKGROUND OF THE INVENTION

1. Field of the Invention

The present invention is related to an epoxy resin formulation and more specifically to an epoxy resin formulation useful as an insulating material for electrical apparatuses.

2. Description of Background and Related Art

There are several known prior art processes related to filled epoxy for use as electrical insulation materials in which one property of the insulation material is improved. However, heretofore nothing in the known art has successfully provided a filled epoxy resin formulation for electrical insulation materials having the requisite balance of properties such as electrical, mechanical, and thermal properties required for a predetermined operating temperature.

Typical cured epoxy casting insulation material formulations with silica filler have a glass transition of about 70-95° C., tensile strength of about 70-90 MPa, thermal conductivity of generally about less than 1.0 W/mK, volume resistivity of about $10^{15}$ to $10^{16}$ ohm-cm, including a number of other properties. Solid insulation materials for various end uses need a requisite balance of these properties such as the aforementioned properties. In addition, insulation materials should have processing characteristics including for example the requisite viscosity prior to cure of the epoxy formulation to be a successfully used as an insulation material for example in the field of electrical apparatuses such as power transformers.

The glass transition temperature (Tg) is an especially critical property in the insulation in that as the glass transition is approached (and subsequently passed) mechanical and thermomechanical properties, as measured through a temperature sweep using a Dynamic Mechanical Analyzer or measurement in an environmental chamber at some elevated temperature or temperature ramp, such as storage modulus decrease, tensile strength decrease; electrical insulation properties such as volume resistivity and dielectric strength decrease; and coefficient of thermal linear expansion increases. The changes in the above combination of properties may lead to the premature failure of the insulation material which, in turn, leads to shorting out. For example, *Journal of Applied Polymer Science,* 1981, 26, 2211 describes a decrease in dielectric strength as Tg is approached in cured epoxy resins. It is also known that a decrease in tensile strength and increase in coefficient of thermal linear expansion of cured epoxy resin products occurs as Tg is approached. Increasing the Tg of an epoxy insulation material is a way to increase the use temperature (including short term higher temperature incursions) of for example a power transformer. However, as Tg is increased in cured epoxy resins, the strength of the material decreases; and thus, brittleness can increase in the insulation material making the insulation material more susceptible to cracking. As a result, cracking contributes to the failure of electrical insulation materials as evidenced by electrical shorting.

It would be useful for electrical insulation applications to develop a filled epoxy formulation having a balance of properties such as Tg, tensile strength; volume resistivity; dielectric breakdown strength and thermal conductivity such that the insulation with the balance of required properties such as electrical, mechanical, and thermal properties can be used at a predetermined continuous operating temperature.

SUMMARY OF THE INVENTION

Prior to the present invention, no one has developed an epoxy insulating material for electrical apparatuses such as power transformers with the balance of all the required electrical, mechanical, and thermal properties required for a continuous operating temperature of 120° C. and higher. The present invention achieves this balance of properties for applications such as dry transformers unlike the prior art. The materials of the present invention can be used at lower operating temperatures if so desired and offer the advantage that in such lower operating temperature systems the ability to better perform during excursions to higher temperatures than normal operating temperatures.

The present invention is directed to an epoxy curable formulation or composition useful as electrical insulating material for electrical apparatuses such as power transformers. For example, one broad embodiment of the curable composition of the present invention comprises (a) at least one liquid epoxy resin; (b) at least one liquid cyclic anhydride hardener; (c) at least one thermally conducting and electrically insulating filler, wherein the filler is an epoxy-silane treated filler and wherein the filler has a size between about 5 microns and about 35 microns; (d) at least one amine cure catalyst having no amine hydrogens; and (e) other optional compounds; wherein the epoxy resin formulation composition upon curing provides a cured product with a balance of properties comprising Tg, tensile strength, dielectric strength, and volume resistivity.

The present invention leads to the requisite balance of electrical, mechanical, and thermal properties along with processing attributes needed for a coated, impregnated, or cast epoxy electrical insulation for coils and windings in a next generation dry transformer by utilizing the proper selection of elements, including mixtures of the elements, of epoxy resins, anhydride hardeners, fillers, catalysts, and optional components.

In one embodiment of the present invention, the composition of the present invention may be designed for a continuous operating temperature of greater than (>) about 120° C. and a Tg of greater than or equal to about 140° C., a thermal conductivity of > about 1.00 W/mK, a dielectric strength of > about 20 kV/mm, and a tensile strength of at least equivalent to incumbent formulations such as for example > about 80 MPa. The composition of the present invention advantageously has an overall balance of mechanical, thermal, and electrical properties with appropriate toughness and robustness to be utilized as the electrical insulation in application area of dry-type transformers.

In another embodiment, the formulation prior to cure has a viscosity sufficient to coat, impregnate, and/or cast the coils and windings of the transformer and to provide the formulation with an appropriate pot-life. For example, the complex viscosity of the composition may be less than about 100,000 mPa-s in one embodiment, and may be less than about 20,000 mPa-s in another embodiment at casting temperature which allows the formulation to be applied (e.g. by coating, impregnating, and/or casting) to the coils and windings of a transformer.

With the balance of processing viscosity at casting temperature and the balance of properties upon curing the formulation, the present invention provides the requisite properties for electrical insulation, both mechanical and electrical, as well as its castability. The present invention provides an improvement over the prior art epoxy electrical insulation systems as such prior known systems are unable to be utilized in a power transformers which operate at higher temperatures.

DETAILED DESCRIPTION OF THE INVENTION

In its broadest scope the present invention is directed to an epoxy resin formulation composition comprising (a) at least one liquid epoxy resin; (b) at least one liquid cyclic anhydride hardener; (c) at least one thermally conducting and electrically insulating filler, wherein the filler is an epoxy-silane treated filler and wherein the filler has an average particle size of between about 5 microns and about 35 microns; and (d) at least one amine cure catalyst having no amine hydrogens.

The epoxy resin used in the present invention may be any epoxy resin component or combination of two or more epoxy resins known in the art such as epoxy resins described in Lee, H. and Neville, K., *Handbook of Epoxy Resins*, McGraw-Hill Book Company, New York, 1967, Chapter 2, pages 2-1 to 2-27. Particularly suitable other epoxy resins known in the art include for example epoxy resins based on reaction products of polyfunctional alcohols, phenols, cycloaliphatic carboxylic acids, aromatic amines, or aminophenols with epichlorohydrin. A few non-limiting embodiments include, for example, bisphenol A diglycidyl ether, bisphenol F diglycidyl ether, resorcinol diglycidyl ether, and triglycidyl ethers of para-aminophenols. Other suitable epoxy resins known in the art include for example reaction products of epichlorohydrin with o-cresol novolacs, hydrocarbon novolacs, and, phenol novolacs. The epoxy resin may also be selected from commercially available products such as for example, D.E.R. 331®, D.E.R.332, D.E.R. 354, D.E.R. 580, D.E.N. 425, D.E.N. 431, D.E.N. 438, D.E.R. 736, or D.E.R. 732 epoxy resins available from The Dow Chemical Company.

In another embodiment, the epoxy resin component useful in the composition of the present invention may include a divinylarene dioxide. Divinylarene dioxides, particularly those derived from divinylbenzene such as for example divinylbenzene dioxide (DVBDO), are class of diepoxides which have a relatively low liquid viscosity but a higher rigidity and crosslink density than conventional epoxy resins. For example, the viscosity of the divinylarene dioxide useful in the present invention ranges generally from about 0.001 Pa s to about 0.1 Pa s in one embodiment, from about 0.01 Pa s to about 0.05 Pa s in another embodiment, and from about 0.01 Pa s to about 0.025 Pa s, at 25° C. in still another embodiment.

The divinylarene dioxide useful in the present invention may include for example a divinylarene dioxide produced, for example, by the process described in WO2010077483, incorporated herein by reference. The divinylarene dioxide compositions that are useful in the present invention are also disclosed in, for example, U.S. Pat. No. 2,924,580, incorporated herein by reference. More specifically, examples of the divinylarene dioxide useful in the present invention may comprise divinylbenzene dioxide, divinylnaphthalene dioxide, divinylbiphenyl dioxide, divinyldiphenylether dioxide, and mixtures thereof.

Still another embodiment of epoxy resins useful as component (a) in the present invention include for example, the epoxy resins described in U.S. Patent Application Publication No. US20090186975 and WO 99/67315, incorporated herein by reference. For example, embodiments of the epoxy resins used within the context of the present invention include aromatic and/or cycloaliphatic compounds. Cycloaliphatic epoxy resins include for example hexahydro-o-phthalic acid-bis-glycidyl ester, hexahydro-m-phthalic acid-bis-glycidyl ester, 3,4-epoxycyclohexylmethyl-3,4'-epoxycyclohexane carboxylate, or hexahydro-p-phthalic acid-bis-glycidyl ester. Also aliphatic epoxy resins, for example 1,4-butanediol diglycidyl ether, 1,6-hexanediol diglycidyl ether, or trimethylolpropane triglycidyl ether, may be used as a component for the composition of the present invention. Epoxy resins are reactive glycidyl compounds containing at least two 1,2-epoxy groups per molecule. In one embodiment, a mixture of polyglycidyl compounds may be used such as for example a mixture of diglycidyl- and triglycidyl-compounds.

Epoxy compounds useful for in the present invention may comprise unsubstituted glycidyl groups and/or glycidyl groups substituted with methyl groups. These glycidyl compounds may have a molecular weight between about 150 and about 1200 in one embodiment, and between about 150 and about 1000 in another embodiment. The glycidyl compounds may be solid or liquid.

One embodiment of the present invention includes at least one epoxy resin useful as component (a) that comprises (i) a liquid at room temperature (e.g. about 25° C.) and remains a liquid up to a temperature of mixing and degassing the epoxy formulation; (ii) becomes a liquid at a temperature between room temperature and up to and including about 80° C.; or (iii) mixtures thereof. In one embodiment of the present invention the epoxy resin, including blends, has a viscosity ranging from about 5 mPa s to about 50,000 mPa s over the temperature range of about 25° C. to about 52° C. In another embodiment, the epoxy resin, including blends, has a viscosity range from about 10 mPa s to about 28,000 mPa s at about 25° C.

In another embodiment, the epoxy resin useful as component (a) of the present invention may include bisphenol A diglycidyl ether, bisphenol F diglycidyl ether, epoxy novolac resin, and mixtures thereof. In still another embodiment, the epoxy resin may include for example bisphenol F diglycidyl ether, epoxy novolac resin, and mixtures thereof.

As an illustration of embodiments of epoxy resins useful in the present invention, the epoxy resins may include those epoxy resins defined by Structure (I) below where n is the average value for either one component or a mixture of two or more components.

Structure (I)

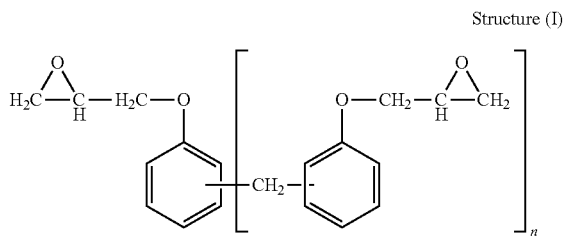

wherein n generally is in the range of $1 \le n \le 2.9$ in one embodiment, $1 \le n \le 2.7$ in another embodiment, and $1 \le n \le 1.9$ in still another embodiment, and $1 \le n \le 1.6$ in yet another embodiment. In another embodiment n may be in the range of $1.2 > n \le 2.9$.

The concentration of the epoxy resin, component (a) used in the formulation of the present invention may range generally from about 7 wt % to 30 wt % in one embodiment, from about 10 wt % to about 25 wt % in another embodiment, from about 12 wt % to about 23 wt % in still another embodiment, and from about 15 wt % to about 20 wt % in yet another embodiment.

In general, the curing agent (also referred to as a hardener or cross-linking agent) useful as component (b) for the curable epoxy resin formulation or composition of the present invention, may comprise a liquid, cyclic anhydride curing agent. The curing agent may be selected, for example, from one or more cyclic anhydride curing agents well known in the art. The curing agent may comprise any cyclic anhydride curing agent known in the art for curing epoxy resins including mixtures that are liquid at room temperature (e.g. about 25° C.); and curing agents that are liquid at the temperature at which the formulation is mixed and/or degassed up to a temperature of about 80° C. The formulation of the present invention includes a cyclic anhydride hardener that is soluble in the epoxy resin, component (a). In one embodiment of the present invention, the cyclic anhydride curing agents and mixtures thereof used in the present invention may include a liquid or a low melting solid (i.e. a solid having a melting point of less than about 80° C.).

In addition, the cyclic anhydride hardener includes a hardener that does not substantively sublime or substantively volatilize during the degassing step of preparing the formulation of the present invention. Indicators of volatility may be reflected by (i) the boiling point of a specific cyclic anhydride which may be pressure dependent, and/or (ii) the vapor pressure of a specific cyclic anhydride at a given temperature. For example, cyclic anhydride hardeners useful in the present invention may have high boiling points which will be generally greater than about 200° C. in one embodiment, and greater than about 250° C. at atmospheric pressure in another embodiment. Boiling points decrease as the pressure is reduced (i.e. application of vacuum) and generally the boiling points of the cyclic anhydride useful in the present invention may be greater than 100° C. at the vacuums utilized for degassing the formulations of the present invention.

As an illustration embodiments of the present invention, nadic methyl anhydride has a boiling point of about 295° C. at atmospheric pressure, a boiling point of about 140° C. at 10 Torr and a boiling point of about 132° C. at 2 Torr; methyltetrahydrophthalic anhydride has a boiling point of about 290° C. at atmospheric pressure; hexahydrophthalic anhydride has a boiling point of about 296° C. at atmospheric pressure and a boiling point of 136° C. at 5 Torr; and methylhexahydrophthalic anhydride has a boiling point of about 290° C. at atmospheric pressure.

Vapor pressure of cyclic anhydride hardeners increase with increasing temperature; and to minimize anhydride volatilization during degassing of the formulations of the present invention as well as during the initial curing of the formulations, it is desired that the vapor pressure value be relatively small at the temperature at which degassing is being performed. For example, illustrative vapor pressures for cyclic anhydrides may be 1.7 mmHg at 120° C. for nadic methyl anhydride; 3.0 mmHg at 120° C. for tetrahydrophthalic anhydride; 3.0 mmHg at 120° C. for methylhexahydrophthalic anhydride; 2.0 mmHg at 120° C. for methyltetrahydrophthalic anhydride; and 3.7 mmHg at 120° C. for hexahydrophthalic anhydride.

Blends of cyclic anhydride hardeners can have particular practical advantages in that the blends may be less susceptible to crystallization if one of the components can be a solid at room temperature. In addition, a mixture of cyclic anhydride hardeners may provide the ability to adjust the vapor pressure for the mixture by mixing a low vapor pressure cyclic anhydride with a higher vapor pressure cyclic anhydride hardener. Vapor pressure of a mixture is generally dependent on the vapor pressure of each chemical component and the mole fraction of the component present in an ideal mixture or solution as described by Raoult's Law. For example, based on vapor pressures known in the art, by blending nadic methyl anhydride having a vapor pressure of 1.7 mmHg at 120° C. with other cyclic anhydrides which generally have a higher vapor pressure than nadic methyl anhydride, it is expected to lead to a mixture of anhydrides with an intermediate vapor pressure that advantageously is expected to remain a liquid.

A further attribute of the liquid cyclic anhydride useful in the present invention, including mixtures, is the viscosity of the hardener at room temperature; and the viscosity of the hardener at the temperature at which the individual components of the total formulation are mixed. Viscosity may be measured by well known devices and methods in the art with rotational viscometers such Brookfield viscometers as well as glass capillaries for dynamic viscosities described, for example, in testing standards such as, but not limited to, ISO 2555, ASTM D-2983, and ASTM D-445. For example, the viscosity of the liquid cyclic anhydride may be generally from about 30 mPa-s to about 350 mPa-s at 25° C. with these viscosities becoming lower as the temperature of the liquid increases. For ease of mixing, degassing and transferring the formulations of the present invention, viscosities less than 350 mPa-s at 25° C. may be used. It may also be advantageous to utilize mixtures of cyclic anhydrides to tailor or reduce the viscosity of the mixture of cyclic anhydrides since by mixing a lower viscosity cyclic anhydride with a higher viscosity anhydride results in a mixture with an intermediate viscosity that may be advantageously less susceptible to crystallization if any one of the cyclic anhydrides can be a solid between about 25° C. and about 100° C. In formulations of the present invention, the viscosity of the liquid components may play a significant role in the total viscosity of the total formulation and may influence the level of solid filler that can be used in the formulation and still remain castable prior to curing.

Cyclic anhydride curing agents useful in the present invention can contain limited amounts of carboxylic acid(s) functionalities which also can function as a curing agent. Generally, it is desired that a predominance of the hardener used in the present invention comprise an anhydride such that in one embodiment the anhydride is greater than about 60 percent (%) in a mixture containing carboxylic acid, greater than about 80% in another embodiment, greater than about 90% in still another embodiment, and greater than about 97% in yet another embodiment.

In one embodiment, the anhydride curing agent useful in the present invention may include for example, cyclic anhydrides of aromatic, aliphatic, cycloaliphatic and heterocyclic polycarbonic acids which may or may not be substituted with alkyl, alkenyl, or halogen groups. Examples of anhydride curing agents include phthalic anhydride, tetrahydrophthalic anhydride, methyl tetrahydrophthalic anhydride, hexahydrophthalic anhydride, methyl hexahydrophthalic anhydride, nadic methyl anhydride, succinic anhydride, dodecenylsuccinic anhydridem, glutaric anhydride, pyromellitic anhydride, maleic anhydride, isatoic anhydride, benzophenonetetracarboxylic anhydride, and mixtures thereof.

Other curing agents useful in the present invention include the anhydride curing agents described in U.S. Pat. No. 6,852,415, incorporated herein by reference. In one embodiment, the liquid cyclic anhydride curing agents include tetrahydrophthalic anhydride, methyl tetrahydrophthalic anhydride, hexahydrophthalic anhydride, methyl hexahydrophthalic anhydride, nadic methyl anhydride, and mixtures thereof. In another embodiment, the liquid cyclic anhydride curing agents include tetrahydrophthalic anhydride, methyl tetrahydrophthalic anhydride, nadic methyl anhydride, and mixtures thereof. In still another embodiment, the liquid cyclic anhydride curing agent includes methyl tetrahydrophthalic anhydride and nadic methyl anhydride and mixtures thereof. In yet another embodiment, the liquid cyclic anhydride curing agent includes nadic methyl anhydride and mixtures thereof.

As an illustration of one embodiment of the present invention, nadic methyl anhydride is used as the cyclic anhydride curing agent in the composition of the present invention. Nadic methyl anhydride is a liquid cyclic anhydride hardener which has particularly desirable attributes for the formulations of the present invention such as being a liquid at room temperature, having a viscosity of less than about 300 mPa-s at 25° C., having a high boiling point of about 132° C. at 2 mm Hg or 140° C. at 70 mm Hg, having a vapor pressure of 5 mm Hg at 120° C. with the latter attributes indicative of ability to remain in a formulation with limited volatilization during degassing of the formulation. Use of nadic methyl anhydride in the hardener for the formulation for the present invention may also advantageously provide good wettability of fillers and facilitate adhesion of filler to cured epoxy resins. Use of nadic methyl anhydride in the hardener for the formulation for the present invention may also advantageously provide other uses such as generally resulting in low exothermic behavior during cure and low shrinkage while the formulation of the present invention is being cured. Additionally, use of nadic methyl anhydride in the hardener of the present invention generally may lead to an increase in the Tg of the cured product of the present invention as compared to other liquid anhydride hardeners. In addition, use of nadic methyl anhydride in the hardener of the present invention generally may lead to improved thermomechanical properties.

In another embodiment, a combination comprising nadic methyl anhydride and methyl tetrahydrophthalic anhydride may be used in the present invention. For example, the amount of the nadic methyl anhydride in the above combination may be generally from about 5 wt % to about 95 wt % of the total liquid cyclic anhydride in one embodiment; from about 20 wt % to about 80 wt % of the total liquid cyclic anhydride in another embodiment; from about 35 wt % to about 65 wt % of the total liquid cyclic anhydride in still another embodiment, and from about 45 wt % to about 55 wt % of the total liquid cyclic anhydride in yet another embodiment.

The concentration of the anhydride hardener, component (b) used in the formulation of the present invention may range generally from about 7 wt % to 35 wt % in one embodiment, from about 10 wt % to about 30 wt % in another embodiment, from about 12 wt % to about 25 wt % in still another embodiment, and from about 15 wt % to about 23 wt % in yet another embodiment.

Generally, the amount of cyclic anhydride curing agent that can be used in the present invention may be over a range of equivalents (i.e. moles) of anhydride to epoxy. For example, the curing agent may range from about 0.2 to about 1.5 equivalents of anhydride groups per epoxy equivalent. In another embodiment, the range may be from about 0.4 to about 1.2 equivalents of anhydride groups per epoxy equivalent. In yet another embodiment, the range may be from about 0.7 to about 1.1 equivalents of anhydride groups per epoxy equivalent. In still another embodiment, the range may be from about 0.8 to about 1.0 equivalent of anhydride groups per epoxy equivalent.

In the present invention, a filler comprising a thermally conducting and electrically insulating solid filler may be useful as component (c) for the composition or formulation of the present invention. One filler or a combination of fillers may be used in the present invention.

By "thermally conducting and electrically insulating" with reference to a filler herein it is meant that the filler may have a thermal conductivity of greater than about 1 W/mK and an electrical insulation value, i.e. a dielectric strength, of greater than about 10 kV/mm.

The thermal conductivity is one attribute of the solid filler that is beneficial for the formulations and compositions of the present invention. For example, a cured epoxy resin prepared from epoxy resin and anhydride hardener in the absence of filler has a thermal conductivity of less than 1.0 W/mK and is generally less than 0.5 W/mK. Due to the low thermal conductivity of a cured, unfilled epoxy resin, it is advantageous for the filler or a blend of fillers, to have a thermal conductivity greater than about 1.0 W/mK so that the cured formulation of the present invention can have a thermal conductivity of at least about 1.0 W/mK.

The thermal conductivity of a filler or blend of fillers of the present invention generally may be greater than about 0.5 W/mK in one embodiment, greater than about 1 W/mK in another embodiment, greater than about 1.2 W/mK in still another embodiment, greater than about 2 W/mK in yet another embodiment, greater than about 4 W/mK in even still another embodiment, and greater than about 6 W/mK in even yet another embodiment. In one embodiment, the thermal conductivity of a filler or blend of fillers of the present invention generally may be from about 0.5 W/mK to about 350 W/mK; from about 0.75 W/mK to about 250 W/mK in another embodiment; from about 1 W/mK to about 200 W/mK in still another embodiment; and from about 2 W/mK to about 20 W/mK in yet another embodiment. In an embodiment wherein a mixture of fillers is used in the present invention, the mixture of fillers may have a final average thermal conductivity in the aforementioned thermal conductivity ranges.

The electrical insulation property of the solid filler or blend of fillers of the present invention is another attribute that is beneficial for the formulations and compositions of the present invention using the solid filler of the present invention. Electrical insulation may be indicated by measuring the dielectric strength of the filler. Generally, the filler, or blend of fillers, has a dielectric strength of from about 5 kV/mm to about 200 kV/mm in one embodiment; from about 10 kV/mm to about 100 kV/mm in another embodiment, and from about 15 kV/mm to about 50 kV/mm in still another embodiment.

The fillers useful in the present invention are solids and as such may form a solid during the preparation or curing of the formulations of the present invention. In one embodiment, the fillers are used in the solid state throughout the mixing, degassing, transferring, and curing of the formulations of the present invention.

In the present invention, at least one of the fillers utilized in the composition of the present invention comprises a surface treated filler wherein the filler is surface treated either before incorporation in the formulation or in-situ during the compounding of the formulation. In one embodiment, at least one of the fillers may be surface treated prior to formulating with the system of the present invention. The surface of the fillers can be treated to improve filler and polymer interaction. Examples of various surface treatments of fillers include fatty acids, silane coupling agents, titanates, zirconates, aluminates, or silazane compounds.

In one embodiment of the present invention, for example, the filler may be surface treated with silane, by silane coupling or silane sizing agents, often referred to as silanized;

and the functionality or modification of resulting filler is such that it is compatible or can react as part of the epoxy curing process. In general, the silane coupling agent contains at least one alkoxy group to facilitate surface treatment, and optionally to facilitate bonding to the inorganic filler. In another embodiment, the silane coupling agent may contain another group including for example epoxy, amine, hydroxyl, carboxyl, vinyl, allyl, hydrosilyl (i.e. SiH), or other functionalities that can react with the epoxy formulation or be compatible or miscible with the epoxy component of the formulation of the present invention.

In still another embodiment, at least one filler useful in the composition of the present invention is treated with the silane coupling agent that is a member of the epoxy-silane class of compounds such as for example, 3-glycidoxypropyltrimethoxysilane which is commercially available from Dow Corning Corporation under the tradename Dow Corning Z-6040 Silane.

Yet another embodiment of a silane treated filler useful in the present invention may include an epoxy-silane treated filler such as for example an epoxy-silane treated quartz. Examples of an epoxy-silane treated quartz useful in the present invention may include those which are commercially available from Quarzwerke under the tradename SILBOND with different grades described as 126 EST, W6 EST, W12 EST, 100 EST, 600 EST, and 800 EST, and mixtures thereof.

The filler material useful in the present invention may have various shapes or morphologies. Acceptable filler morphologies of the filler material useful in the present invention include shapes such as platelets, fibers, spheres, granules, needles, which may be crystalline, semi-crystalline or amorphous, or any combination thereof. In some embodiments, fillers with different size distributions and different shapes may be combined to have a synergistic effect on the viscosity of the curable composition; and on the coefficient of thermal expansion (CTE), modulus, strength, and electrical and/or heat conductivity of the cured composition.

The filler material of the present invention, when used in granular form, generally may have an average particle size, often designated $d_{50\%}$ in the micron range, sufficient to promote an acceptable processing viscosity for the curable composition of the present invention prior to cure and to promote a balance of acceptable thermomechanical properties after cure. For example, the average particle size for granular filler may be generally in the range of from about 1 micron ($\mu$m) to about 100 $\mu$m in one embodiment, from about 2 $\mu$m to about 50 $\mu$m in another embodiment, from about 5 $\mu$m to about 35 $\mu$m in still another embodiment, and from about 12 $\mu$m to about 25 $\mu$m in yet another embodiment.

The mechanical or thermomechanical performance (i.e. such as storage modulus, tensile strength; electrical insulation properties such as volume resistivity and dielectric strength decrease; and coefficient of thermal linear expansion as measured at a temperature of greater than ambient temperature or through a temperature sweep or ramp) of the cured filled insulating material may be improved by incorporating particulate filler as described above into the curable composition of the present invention. Use of the fillers of the present invention may also provide other advantages such as reduced shrinkage during curing of the formulation as well as other attributes such as reduced water absorption, improved electric strength, improved environmental aging, and other attributes in a cured formulation.

The formulation of the present invention may include one or more fillers such as for example metal oxides, metal nitrides, metal carbides, metal hydroxides, metal carbonates, metal sulfates, natural and synthetic minerals mainly silicates, and aluminum silicates; and mixtures thereof.

Examples of fillers useful in the present invention may include quartz, fused silica, natural silica, synthetic silica, natural aluminum oxide, synthetic aluminum oxide, slate, hollow fillers, aluminum trihydroxide, magnesium hydroxide, aluminum hydroxide oxide, boron nitride, aluminum nitride, silicon nitride, silicon carbide, mica, zinc oxide, aluminum nitride, mullite, wollastonite, vermiculite, talcum, glimmer, kaolin, bentonite, xonolit, andalusite, zeolithe, dolomite, glass powder, glass fibers, glass fabrics, other organic or inorganic particulate fillers, and mixtures thereof. The fillers may be either added into the formulation in their end state or formed in-situ.

In one embodiment, the fillers used in the present invention may be selected from the group consisting of quartz, natural silica, synthetic silica, natural aluminum oxide, synthetic aluminum oxide, boron nitride, aluminum nitride, wollastonite, glass powder, glass fibers, and glass fabrics. In another embodiment, the filler useful in the present invention is an epoxy-silane treated quartz.

Filler loadings useful in the present invention may vary. Generally, the concentration of the total filler present in the formulation of the present invention may be from about 40 wt % to about 90 wt % in one embodiment, from about 50 wt % to about 80 wt % in another embodiment, from about 60 wt % to about 70 wt % in still another embodiment, and from about 62 wt % to about 68 wt % in yet another embodiment; based on the weight of the total formulation or composition.

In one embodiment of the present invention, for example when the formulation is used as an insulating material for electrical apparatuses such as power transformers and more specifically as an electrically insulating material for dry transformers, the formulations of the present invention generally have a high filler concentration such as for example greater than about 60 wt % filler to improve thermomechanical properties of the cured system and impart better component reliability performance.

As aforementioned, the filler component used in the present invention formulation may be a combination of two or more fillers. In an embodiment wherein the filler comprises an epoxy-silane treated quartz, for example, the epoxy-silane treated quartz may be 100% of the filler utilized in the composition of the present invention. In another embodiment, one or more fillers different from the epoxy-silane treated quartz may be used in combination with the epoxy-silane treated quartz as long as the amount of the other different filler or fillers used is less than the epoxy-silane treated quartz.

For example, the other different filler or fillers (other than the epoxy-silane treated quartz) may be less than 50 wt % of the total filler used in the formulation or composition in one embodiment, less than about 35 wt % of the total filler used in the formulation or composition in another embodiment, less than about 20 wt % of the total filler used in the formulation or composition in still another embodiment, and less than or equal to about 10 wt % in yet another embodiment. As aforementioned, the other different filler other than the epoxy-silane treated quartz may be 0 wt % of the total filler used in the formulation of this invention.

Any one or more of the fillers previously described above may be used as the other different filler or fillers in the combination with the epoxy-silane treated quartz to make up the filler material of component (c). The other different filler may or may not be surface treated. In general, however the other different filler can also be surface treated in one embodiment, for example silane treated, and more specifically epoxy-silane treated as described above similar to the epoxy-silane treated quartz.

In preparing the curable resin formulation of the present invention, at least one cure catalyst or promoter may be used to facilitate the reaction of the epoxy resin with the curing agent. The cure catalyst useful in the present invention may include for example, nucleophilic catalysts, tertiary amines, amine complexes, urea derivatives, imidazoles, substituted imidazoles, and Lewis bases having the ability to catalyze curing, and mixtures thereof. Depending on the catalyst and reaction conditions the catalyst can optionally co-react into the formulation.

The catalyst, component (d), useful in the present invention may include catalysts well known in the art, such as for example, catalyst compounds containing amine, phosphine, heterocyclic nitrogen, ammonium, phosphonium, arsonium, sulfonium moieties, and any combination thereof. Some non-limiting examples of the catalyst of the present invention may include, for example, ethyltriphenylphosphonium; benzyltrimethylammonium chloride; heterocyclic nitrogen-containing catalysts described in U.S. Pat. No. 4,925,901, incorporated herein by reference; imidazoles; triethylamine; and any combination thereof.

The selection of the catalyst useful in the present invention is not limited except that the catalyst cannot contain amine hydrogens and many commonly used catalysts for epoxy systems can be used. Also, the addition of a catalyst may depend on the system prepared. Examples of catalyst useful in the present invention include tertiary amines, 1-substituted imidazoles, organo-phosphines, and acid salts.

Embodiments of catalysts useful in the present invention include tertiary amines such as, for example, triethylamine, tripropylamine, tributylamine, 1-methylimidazole, benzyldimethylamine, and mixtures thereof. In still another embodiment, the catalyst may be at least one 1-hydrocarbon substituted imidazole such as 1-methylimidazole.

The concentration of the catalyst used in the present invention in the organic portion of the formulation may range generally from about 0.005 wt % to about 2 wt % in one embodiment, from about 0.01 wt % to about 1.5 wt % in another embodiment, from about 0.1 wt % to about 1 wt % in still another embodiment, and from about 0.2 wt % to about 0.8 wt % in yet another embodiment. Epoxy formulation concentrations of the catalyst below about 0.005 wt %, the curing of the formulation would be too slow and epoxy formulation concentrations of the catalyst above about 2 wt %, the curing would be too fast, i.e., it would shorten pot life/time for casting. Concentrations outside the above for the catalyst may also change the network and nature of crosslink since other moieties like hydroxyls can start participating in network; and a possible change in the network could influence some of the properties of the resulting cured product.

Other optional components or additives that may be useful in the present invention are components normally used in resin formulations known to those skilled in the art. For example, the optional components may comprise compounds that can be added to the composition to enhance processing and/or application properties (e.g. surface tension modifiers, viscosity lowering agents, or flow aids), reliability properties (e.g. adhesion promoters, compatibilizing agents, and surface treatment agents), release agents (e.g. mold release), the reaction rate, the selectivity of the reaction, and/or the catalyst lifetime. For example, accelerators are hydrogen donating compounds for example with hydroxyl groups and include materials like phenolic compounds, benzyl alcohol, glycols, and polyglycols that can donate hydrogen or hydrogen bond and contribute to an increased rate of cure.

An assortment of additives may be added to the compositions of the present invention as optional components including for example, reactive diluents, non-reactive diluents, toughening agents, flexibilizers, thixotropic agents, stabilizers, plasticizers, catalyst de-activators, and the like; and mixtures thereof.

For example, with regard to the optional reactive diluents, a subclass of epoxy resins, are typically of low viscosity and often lower molecular weight as compared to most epoxy resins; and upon the addition of reactive diluents to a formulation, the reactive diluents provide a means for advantageously lowering the viscosity of a complete formulation for improved processability as compared to a formulation without the reactive diluents. Formulation with reactive diluents can lead to processing advantages or provide opportunities to increase the amount of filler utilized in a formulation and/or to utilize a filler of smaller size. Epoxy containing reactive diluents are often derived from relatively compact hydroxyl-containing compounds such as alcohols, glycols (including multifunctional hydroxyl-containing compounds) and epichlorohydrin or glycidyl esters of carboxylic acids (including multifunctional carboxylic acid containing compounds). Epoxidized vegetable oils may also be used as reactive diluents. Reactive diluents typically contain at least one epoxy group in one embodiment; and may contain more than one epoxy group in another embodiment. Examples of reactive diluents useful in the present invention, but not limited thereto, include 1,4-butanediol diglycidylether, 1,6-hexanediol diglycidylether, trimethylolpropane triglycidylether, triglycidyl ether of propoxylated glycerine, epoxidized castor oil, epoxidized linseed oil, ortho-cresyl glycidyl ether, alkyl glycidyl ether, neopentyl glycol diglycidylether or mixtures thereof. Reactive diluents have viscosities ranging from about 1 mPa s to about 500 mPa s at 25° C.

Other additives useful in the formulation of the present invention include for example, a halogen containing or halogen free flame retardant; a synergist to improve the performance of the flame extinguishing ability such magnesium hydroxide, zinc borate, or metallocenes; a solvent for processability including for example acetone, methyl ethyl ketone, an Dowanol PMA; adhesion promoters such as modified organosilanes (epoxidized, methacryl, amino), acetylacetonates, or sulfur-containing molecules; wetting and dispersing aids such as modified organosilanes, Byk 900 series and Byk W-9010, modified fluorocarbons; air release additives such as Byk-A 530, Byk-A 525, Byk-A 555, Byk-A 560; surface modifiers such as slip and gloss additives (a number of which are available from Byk-Chemie), and mixtures thereof.

The amount of the other optional additives useful in the present invention is such that the Tg of the cured composite is maintained at a level of greater than about 140° C. The concentration of the additives used in the present invention may range generally from 0 wt % to about 10 wt % in one embodiment, from about 0.01 wt % to about 5 wt % in another embodiment, from about 0.1 wt % to about 2.5 wt % in still another embodiment, and from about 0.5 wt % to about 1 wt % in yet another embodiment, based on the total weight of the composition.

The process for preparing a composition of matter epoxy formulation useful as insulating material for dry transformers includes blending (a) at least one liquid epoxy resin; (b) at least one liquid cyclic anhydride hardener; (c) at least one thermally conducting and electrically insulating epoxy-silane treated filler, (d) at least one cure catalyst with no amine hydrogens, and (e) optionally, other ingredients as desired.

For example, the preparation of the curable epoxy resin formulation of the present invention is achieved by blending with or without vacuum in a Ross PD Mixer (Charles Ross), a FlackTek Speedmixer or other mixer known in the art that wets out the filler with and distributes evenly the resin components (a)-(e) above. The above mentioned elements can generally be added in most any sequence, various combinations, and various times of additions as is convenient and desired. For example, to lengthen pot-life the cure catalyst (d) maybe added last or at later time during mixing and optional degassing, but prior to casting the formulation. Any of the above-mentioned optional assorted formulation additives, for example an additional epoxy resin, may also be added to the composition during the mixing or prior to the mixing to form the composition.

In one embodiment, one or more of the components (a)-(e) above of the formulation may be premixed. For example, the catalyst may be premixed in the hardener or the flexibilizer and then the premixed components may be added into the formulation.

For the formulations of the present invention, degassing of the formulation is an important element in the mechanical and/or electrical performance of the insulation material of the present invention. Typically, the degassing may be carried out by application of vacuum in some mixing apparatus for the formulation, including the individual components. The range of vacuums, ramps and steps of vacuums, and timing of vacuum application to effectively degas a formulation prior to casting and curing depends on a variety of factors as is known in the art which relate for example to the temperature, viscosity of the formulation, mass of formulation, degassing vessel geometry and its quality of mixing and the like. In general, it is desired that vacuum is applied at some point during the mixing of resin components (a)-(e) and vacuum is defined as anything less than atmospheric pressure. Degassing may occur in the same or separate devices and/or vessels as may be used to initially mix any of the components (a)-(e). Mixing or agitation is normally performed when degassing. Most any vacuum can be applied, but rate of degassing improves as lower vacuums are utilized. Degassing is generally done at less than about 200 millibar in one embodiment, less than about 100 millibar in another embodiment, less than about 50 millibar in still another embodiment, and less than about 20 millibar in yet another embodiment. In general, some lower limit of applied vacuum is used for both economic considerations and the desire to minimize volatilization of a component which depends on the component and the temperature of the component. In one embodiment, some vacuum of more than about 0.5 millibar may be utilized in degassing and in another embodiment the vacuum utilized may be more than about 1 millibar.

All the components of the epoxy resin formulation are typically mixed and dispersed; optionally degassed; and transferred at a temperature enabling the preparation of an effective cured epoxy resin composition having the desired balance of properties for example as required for using the composition in transformers applications. The temperature during the mixing and optional degassing of all components, as well as the temperature of the mixture when transferred to a device or mold (i.e. casting temperature) may be generally from about 10° C. to about 110° C. in one embodiment, from about 20° C. to about 90° C. in another embodiment, and from about 40° C. to about 80° C. in still another embodiment. Lower mixing temperatures help to minimize reaction of the resin and hardener components to maximize the pot life of the formulation, but higher mixing temperatures in the short term can lower the formulation viscosity and facilitate mixing, degassing, and transfer of the formulation before being cured.

In general, the viscosity of the complete epoxy resin formulation at the transfer or casting temperature can be any viscosity value at which the formulation flows, as known in the art. In one embodiment for example, the complex viscosity of the complete epoxy resin formulation may be less than about 100,000 mPa-s, less than about 50,000 mPa-s in another embodiment, and less than about 25,000 mPa-s in still another embodiment. Generally, the complex viscosity of the complete epoxy resin formulation is from about 100 mPa-s to about 100,000 mPa-s in one embodiment; from about 500 mPa-s to about 50,000 mPa-s in another embodiment; from about 1,000 mPa-s to about 20,000 mPa-s in still another embodiment; and from about 1,500 mPa-s to about 15,000 mPa-s in yet another embodiment. The above complex viscosity ranges are determined at a casting temperature such as for example generally a casting temperature from about 10° C. to about 110° C. in one embodiment, from about 20° C. to about 90° C. in another embodiment, and from about 40° C. to about 75° C. in still another embodiment.

It is generally desired that the complete formulation of the present invention be mixed, degassed, and transferred to be cured in the shape or apparatus that the insulation material will be generally used in less than about 2 days in one embodiment, less than about 1 day in another embodiment, and less than about 12 hours in still another embodiment, when held at ambient temperature (about 25° C.) up to about 60° C. As known in the art, the pot life (or shelf life) of a complete formulation is dependent not just on the temperature at which the formulation is held but also on the amount and type of catalyst that is included in the formulation with lower concentration of catalyst typically extending the pot life of the formulation. For extended pot life or shelf life, the blended compound formulation is typically stored at sub-ambient temperatures to maximize shelf life and optionally without containing catalyst. Acceptable temperature ranges for storage include for example from about −100° C. to about 25° C. in one embodiment, from about −70° C. to about 10° C. in another embodiment, and from about −50° C. to about 0° C. in still another embodiment. As an illustration of one embodiment, the temperature of storage may be about −40° C. However, it is beneficial to start the transfer of the complete and degassed formulation immediately, rather than storing, to be cured in the shape or apparatus that insulation material will be generally used in.

The blended formulation can then be applied to a substrate via a number of methods for the insulating material for an electrical apparatus such as a power transformer application. For example, typical application methods include vacuum casting, automated pressure gellation (APG), filament winding, vacuum pressure impregnation, resin encapsulated, solid cast, and the like as known to those skilled in the art. A "substrate" herein includes for example a coil of a dry-type power, distribution or instrument transformer, rod composites for outdoor insulators for power lines, elements in outdoors power switches, over-voltage protection devices, switchgear, bushings, electrical machines, coated elements of a transistor, other semi-conductor devices, and/or impregnated electrical components, and the like.

The curing of the thermosettable composition may be carried out at a predetermined temperature and for a predetermined period of time and in a series of temperature ramps and temperature steps sufficient to cure the composition. The curing of the formulation may be dependent on the hardeners used in the formulation. Using more than one temperature step in the curing of the formulation in which some of the steps only partially cure or gel the formulation are hypothesized to facilitate the development of properties of the fully cured formulation. Such a temperature stepped process is hypothesized to better manage the homogeneity, shrinkage, and stresses that occur during the cure of the formulations of the present invention and can lead to a more consistent or better electrically and/or mechanically performing insulation material for electrical apparatuses including power transformers. Whatever the cure profile, it is generally recognized by those skilled in the art that the final cure temperature should generally exceed the glass transition temperature, Tg, of a fully cured epoxy/hardener system. After curing or post-curing the composition, the process may include a controlled cooling that may include single or multiple temperature ramps and temperature steps to minimize the development of stress and possible defects in the electrical insulating, thermally conductive cured material.

For example, the temperature of curing or series of one or more curing steps for the formulation may be generally from about 10° C. to about 300° C. in one embodiment; from about 50° C. to about 250° C. in another embodiment; and from about 80° C. to about 225° C. in still another embodiment. The curing time may be chosen depending on the size and shape of the substrate. Generally, the curing time may be between about 1 minute to about 96 hours in one embodiment, between about 1 hour to about 72 hours in another embodiment, and between about 4 hours to about 48 hours in still another embodiment. Below a period of time of about 1 minute, the time may be too short to ensure sufficient reaction under conventional processing conditions; and above about 96 hours, the time may be too long to be practical or economical. The size and shape of cured epoxy formulation as well as the components of the epoxy formulation play a role in the cure profiles utilized as known to those skilled in the art.

In one embodiment, it is advantageous to partially cure or gel the composition at a first temperature step or ramp of from about 50° C. to about 150° C.; and then carry out at least one further heating step or ramp of from about 120° C. to about 300° C. For example, in one embodiment, the curing stage of the composition may be carried out in at least two steps including for example a first curing step at a temperature of from about 70° C. to about 100° C. and a second curing step at a temperature of from about 130° C. to about 150° C. In another embodiment, a third curing step can be used after the above first and second steps wherein the temperature of the third step is from about from about 175° C. to about 250° C. In any of the steps/ramps described above, the time of heating at the desired temperature can be from about 5 minutes to about 96 hours.

If the formulation or composition is cured too fast or at a temperature too high for a particular temperature step or ramp then it may be more likely to result in decreased performance of the insulation material as well as the device in which the insulation material is utilized. Decreased performance can arise from, but is not limited to, defects in the resulting cured composition which can lead to decreased performance or failure in the formulation or the device in which the formulation is utilized. Examples of such defects include cracks, bubbles, substantive uneven distribution of filler(s), and the like.

The thermoset product (i.e. the cross-linked product made from the curable composition of the present invention) that forms the insulating material of the present invention shows several improved properties over conventional epoxy cured resins. One advantage of the cured product of the present invention is that such cured product has an overall balance of mechanical, thermal, and electrical properties to utilize the formulation as electrical insulation for example in the application area of insulating electrical apparatuses.

For example, the cured product of the present invention may have a glass transition temperature (Tg) of from about 140° C. to about 250° C. Generally, the Tg of the resin is higher than about 140° C. in one embodiment, higher than about 145° C. in another embodiment, higher than about 150° C. in still another embodiment, and higher than about 155° C. in yet another embodiment.

In addition, because the present formulation system allows for a high filler loading, the cured system can achieve a lower CTE below the glass transition of the cured formulation, for example, the thermoset product of the present invention exhibits a coefficient of thermal expansion (CTE) below the Tg as determined by ASTM D 5335 to be generally, from about 1 ppm/° C. to about 75 ppm/° C. in one embodiment. In another embodiment, the CTE may be less than about 75 ppm/° C., less than about 60 ppm/° C. in another embodiment, and less than about 45 ppm/° C. in yet another embodiment.

In addition, the thermoset product of the present invention may also have a thermal conductivity of generally from about 0.8 W/mK to about 50 W/mK in one embodiment. In another embodiment, the thermal conductivity may be greater than about 1.0 W/mK, greater than about 1.1 W/mK in another embodiment, and greater than about 1.2 W/mK in still another embodiment.

The thermoset product of the present invention can also have a dielectric breakdown strength of generally from about 10 kV/mm to about 45 kV/mm in one embodiment. In another embodiment, the dielectric breakdown strength may be greater than or equal to about 20 kV/mm, greater than about 23 kV/mm in another embodiment, and greater than about 27 kV/mm in yet another embodiment.

Another property that the thermoset product of the present invention can have is a volume resistivity generally from about $1 \times 10^{12}$ ohm-cm to about $1 \times 10^{19}$ ohm-cm in one embodiment. In another embodiment, the volume resistivity may be greater than about $1 \times 10^{15}$ ohm-cm, greater than about $4 \times 10^{15}$ ohm-cm in still another embodiment, and greater than about $1 \times 10^{16}$ ohm-cm in yet another embodiment. In one embodiment the volume resistivity may be at least greater than about $5 \times 10^{15}$ ohm-cm, Still another property that the thermoset product of the present invention can have is a tensile strength of generally from about 80 MPa to about 250 MPa in one embodiment. In another embodiment, the tensile strength may be greater than about 80 MPa, greater than about 85 MPa in another embodiment, and greater than about 90 MPa in yet another embodiment.

The above properties provide the thermoset product of the present invention with an overall balance of mechanical, thermal, and electrical properties to utilize the formulation as electrical insulation in the application area of insulating electrical apparatuses. The thermoset product of the present invention advantageously exhibits the above balance of properties at a continuous operating temperature of from about 120° C. to about 200° C. in one embodiment; and from about 130° C. to about 200° C. in another embodiment. In another embodiment, the continuous operating temperature is greater than or equal to about 130° C., greater than or equal to 145° C. in still another embodiment, and greater than or equal to about 160° C. in yet another embodiment.

The epoxy resin formulation of the present invention is used as a curable composition to manufacture an electrical insulating material for transformers, potting applications, switches, transducers, bushings, sensors, converters, transistors, electrical machines, electrical devices, and the like.

EXAMPLES

The following examples and comparative examples further illustrate the present invention in detail but are not to be construed to limit the scope thereof.

Various terms and designations used in the following examples are explained herein below:

D.E.R. 332 is an epoxy resin that is a diglycidyl ether of bisphenol A having an EEW of 171, commercially available from The Dow Chemical Company.

D.E.R. 383 is an epoxy resin that is a diglycidyl ether of bisphenol A having an EEW of 180.3, commercially available from The Dow Chemical Company.

D.E.N. 425 is an epoxy novolac resin having an EEW of 172, commercially available from The Dow Chemical Company.

D.E.R. 354 is an epoxy resin that is a diglycidyl ether of bisphenol F having an EEW of 171.5, commercially available from The Dow Chemical Company.

ERL 4221 is a cycloaliphatic epoxy resin that is also known as (3,4-epoxycyclohexyl)methyl 3,4-epoxycyclohexylcarboxylate having an EEW of 134 and is commercially available from Polysciences.

"TMPTGE" stands for trimethylolpropanetriglycidyl ether, is a reactive diluent epoxy resin having an EEW of 140, and is commercially available from Aldrich Chemical.

"BDODGE" stands for 1,4-butanedioldiglycidyl ether and is a reactive diluent epoxy resin that is commercially available from Aldrich Chemical.

SILBOND® W12EST is an epoxy-silane treated quartz with $d_{50\%}$ grain size of 16 microns, commercially available from Quarzwerke.

SILBOND® 126EST is an epoxy-silane treated quartz with $d_{50\%}$ grain size of 22 microns, commercially available from Quarzwerke.

MILLISIL® W12 is a quartz with $d_{50\%}$ grain size of 16 microns, commercially available from Quarzwerke.

$Al_2O_3$ is a high purity alumina with $d_{50\%}$ grain size of 7.8 microns, commercially available from Baikowski International with the designation BAIKOLOX® GEA 6.

"DVBDO" stands for divinylbenzene dioxide.

"NMA" stands for nadic methyl anhydride, and is commercially available from Polysciences.

"ECA100" stands for Epoxy Curing Agent 100, and is commercially available from Dixie Chemical. ECA100 generally comprises methyltetrahydrophthalic anhydride greater than 80% and tetrahydrophthalic anhydride greater than 10%.

"1MI" stands for 1-methylimidazole, and is commercially available from Aldrich Chemical.

The following standard analytical equipments and methods are used in the Examples:

Mold Assembly

Onto two ~355 mm square metal plates with angled cuts on one edge is secured on each DUOFOIL™ (~330 mm×355 mm×0.38 mm). A U-spacer bar of ~3.05 mm thickness and silicone rubber tubing with ~3.175 mm ID×~4.75 mm OD (used as gasket) are placed between the plates and the mold is held closed with C-clamps. Mold is pre-warmed in about 65° C. oven prior to its use.

Filled Epoxy Resin Casting

The requisite amount of filler is dried overnight in a vacuum oven at a temperature of ~70° C. The epoxy resin and anhydride hardener are separately pre-warmed to ~60° C. Into a wide mouth plastic container is loaded the designated amount of warm epoxy resin, warm anhydride hardener, and 1-methylimidazole which are hand swirled before adding in the warm filler. The container's contents are then mixed on a FlackTek SpeedMixer™ with multiple cycles of ~1-2 minutes duration from about 800 to about 2350 rpm.

The mixed formulation is loaded into a temperature controlled ~500 mL resin kettle with overhead stirrer using glass stir-shaft and bearing with Teflon® blade along with a vacuum pump and vacuum controller for degassing. A typical degassing profile is performed between about 55° C. and about 75° C. with the following stages: 5 minutes, 80 rpm, 100 Torr; 5 minutes, 80 rpm, 50 Torr; 5 minutes, 80 rpm, 20 Torr with $N_2$ break to ~760 Torr; 5 minutes, 80 rpm, 20 Torr with $N_2$ break to ~760 Torr; 3 minutes, 80 rpm, 20 Torr; 5 minutes, 120 rpm, 10 Torr; 5 minutes, 180 rpm, 10 Torr; 5 minutes, 80 rpm, 20 Torr; and 5 minutes, 80 rpm, 30 Torr.

Warm, degassed mixture is brought to atmospheric pressure and poured into the warm mold assembly described above. The filled mold is placed in an 80° C. oven for about 16 hours with temperature subsequently raised and held at 140° C. for a total of 10 hours; then subsequently raised and held at 225° C. for a total of 4 hours; and then slowly cooled to ambient temperature (about 25° C.).

Glass Transition Temperature ($T_g$) Measurements

A portion of the cured epoxy formulation is placed in a differential scanning calorimeter (DSC) with heating and cooling at 10° C./minute at a first heating scan of from 0° C. to 250° C. to a second heating scan of from 0° C. to 250° C. Tg is reported as the half-height value on the second heating scan of from 0° C. to 250° C.

Tensile Property Measurements

Tensile property measurements are made on the cured epoxy formulation according to ASTM D638 using a Type 1 tensile bar with strain rate of 0.2 inch/minute.

Thermal Conductivity Measurements

Thermal conductivity measurements are made on the cured epoxy formulation according to ISO 22007-2 (the transient plane heat source (hot disc) method).

Volume Resistivity

Volume Resistivity was measured at room temperature on a Hewlett-Packard High Resistivity Meter, plaque thickness ranged from 115 to 130 mils.

Dielectric Strength

Dielectric strength was also measured on 115-130 mil plaques using an AC breakdown Tester per ASTM D149 with ramp-up voltage rate of 500V/sec until sample breakdown.

Viscosity of Epoxy Formulation Measurements

Complex viscosity as function of temperature (temperature scan) is obtained using a TA Instruments ARES G2 rheometer fitted with a parallel plate fixture. The plate diameter is 50 mm running in flow mode at shear rates of 10 l/second and at a temperature ramp of at 5° C./minute spanning a temperature range of 40° C. to 100° C. Complex viscosity is reported at the temperature of interest (i.e. casting temperature); or alternatively, a time scan can also be performed at a given temperature. In this case, the rheometer can be set at the temperature of interest with complex viscosity measured as function of time to understand cure characteristics.

Example 1-15 and Comparative Examples A-C

Filled epoxy resin castings are prepared using the general method as described above and the formulations described in Table I below. The properties of the resulting castings are measured by the methods described above and the property results are described in Table II below.

TABLE I

FORMULATION COMPOSITIONS

| Examples | Epoxy (g) | 1MI (g) | NMA (g) | ECA100 (g) | Quartz (g) | Al$_2$O$_3$ (g) |
|---|---|---|---|---|---|---|
| Comparative A | 67.4$^a$ | 0.67 | 63.8 | — | 218.75* | — |
| Comparative B | 77.05$^a$ | 0.77 | 72.95 | — | 250.0$^\$$ | — |
| Comparative C | 38.59$^a$ 38.59$^b$ | 0.76 | 72.06 | — | 250.0$^\$$ | — |
| Example 1 | 76.85$^c$ | 0.76 | 72.39 | — | 250$^\$$ | — |
| Example 2 | 74.05$^c$ | 0.71 | 69.74 | — | 280.5$^\$$ | — |
| Example 3 | 83.27$^c$ | 0.80 | 37.65 | 37.65 | 252.34$^\$$ | 13.28 |
| Example 4 | 75.50$^c$ | 0.72 | 34.14 | 34.14 | 280.5$^\$$ | — |
| Example 5 | 77.19$^d$ | 0.73 | 33.29 | 33.29 | 280.5$^\$$ | — |
| Example 6 | 77.18$^d$ | 0.73 | 33.29 | 33.29 | 266.48$^\$$ | 14.03 |
| Example 7 | 83.27$^c$ | 0.80 | 37.65 | 37.65 | 265.63$^\$$ | — |
| Example 8 | 83.65$^c$ | 0.80 | 49.23 | 25.70 | 265.63$^\$$ | — |
| Example 9 | 73.28$^c$ | 0.70 | 33.14 | 33.14 | 284.75$^@$ | — |
| Example 10 | 71.06$^c$ | 0.68 | 32.14 | 32.14 | 289.0$^@$ | — |
| Example 11 | 77.72$^c$ | 0.74 | 35.14 | 35.14 | 276.25$^\$$ | — |
| Example 12 | 77.61$^e$ | 0.74 | 35.20 | 35.20 | 276.25$^\$$ | — |
| Example 13 | 69.19$^c$ 7.69$^f$ | 0.75 | 35.56 | 35.56 | 276.25$^\$$ | — |
| Example 14 | 69.37$^c$ 7.71$^g$ | 0.75 | 35.46 | 35.46 | 276.25$^\$$ | — |
| Example 15 | 67.84$^c$ 7.54$^h$ | 0.77 | 36.30 | 36.30 | 276.25$^\$$ | — |

$^a$D.E.R. 332
$^b$D.E.N. 431
$^c$D.E.N. 425
$^d$D.E.R. 383
$^e$D.E.R. 354
$^f$ERL 4221
$^g$TMPTGE
$^h$BDODGE
*MILLISIL ® W12
$^\$$SILBOND ® W12EST
$^@$SILBOND ® 126EST

TABLE II

FORMULATION PROPERTIES

| Examples | Tg, 2$^{nd}$ heat, °C. | Tensile Strength, MPa | Tensile Modulus, MPa | % Elongation to Break | Thermal Conductivity, W/mK | Volume Resistivity, ohm-cm | Dielectric Breakdown Strength, kV/mm |
|---|---|---|---|---|---|---|---|
| Comparative A | 190 | 53.5 | 11264 | 0.616 | 0.963 | 5.14E+15 | 27.91 |
| Comparative B | 186 | 68.3 | 11056 | 0.837 | 0.973 | 4.36E+15 | 29.36 |
| Comparative C | 185 | 77.4 | 12634 | 0.922 | 1.019 | 1.92E+15 | 27.34 |
| Example 1 | 175 | 90.4 | 21018 | 1.124 | 1.045 | | |
| Example 2 | 176 | 86.9 | 14166 | 0.93 | 1.196 | >6E+17 | 28.7 |
| Example 3 | 161 | 86.8 | 15330 | 1.01 | 1.074 | 1.14E+16 | 30.6 |
| Example 4 | 161 | 93.7 | 16511 | 2.5 | 1.167 | 7.81E+15 | 30.4 |
| Example 5 | 164 | 89.1 | 10675 | 1.15 | 1.156 | >6E+17 | 29 |
| Example 6 | 165 | 85.0 | 17382 | 0.91 | 1.225 | 1.07E+16 | 31 |
| Example 7 | 164 | 89.1 | 10675 | 1.15 | 1.156 | >6E+17 | 29 |
| Example 8 | 161 | 88.5 | 13298 | 1.08 | | | |
| Example 9 | 157 | 91.9 | 14575 | 0.94 | 1.162 | | |
| Example 10 | 154 | 87.3 | 13624 | 0.91 | 1.168 | | |
| Example 11 | 157 | 94.1 | 13281 | 1.106 | 1.055 | | |
| Example 12 | 147 | 92.2 | 12724 | 1.09 | | | |
| Example 13 | 164 | 86.3 | 10815 | 0.94 | | | |
| Example 14 | 151 | 91.4 | 13391 | 1.05 | | | |
| Example 15 | 148 | 89.8 | 12776 | 1.08 | | | |

The invention claimed is:

1. A curable epoxy resin formulation composition useful as insulation for electrical apparatus comprising (a) at least one liquid epoxy resin; (b) at least one liquid cyclic anhydride hardener; (c) at least one thermally conducting and electrically insulating solid filler, wherein the filler is an epoxy-silane treated filler and wherein the filler has a size between about 1 micron and about 100 microns; and (d) at least one amine cure catalyst having no amine hydrogens; wherein the epoxy resin formulation composition upon curing provides a cured product with a balance of properties comprising a glass transition temperature of at least about 140° C., a tensile strength of at least about 80 MPa, a dielectric strength of at least about 10 kV/mm, a thermal conductivity of at least about 0.8 W/m-K, and a volume resistivity of at least about 1×10$^{12}$ ohm-cm.

2. The epoxy resin formulation composition of claim 1, wherein the at least one epoxy resin is diglycidyl ether of bisphenol A, bisphenol F diglycidyl ether, epoxy novolac, or mixtures thereof.

3. The epoxy resin formulation composition of claim 1, wherein the concentration of the at least one epoxy resin ranges from about 7 weight percent to about 30 weight percent.

4. The epoxy resin formulation composition of claim 1, wherein the at least one anhydride hardener is nadic methyl anhydride, methyl tetrahydrophthalic anhydride, or mixtures thereof.

5. The epoxy resin formulation composition of claim 1, wherein the concentration of the at least one anhydride hardener ranges from about 7 weight percent to about 35 weight percent.

6. The epoxy resin formulation composition of claim 1, wherein the at least one filler is an epoxy-silane treated quartz; and wherein the concentration of the at least one filler ranges from about 40 weight percent to about 90 weight percent.

7. The epoxy resin formulation composition of claim 1, wherein the at least one cure catalyst is a 1-substituted imidazole catalyst; and wherein the concentration of the at least one cure catalyst ranges from about 0.005 weight percent to about 2 weight percent.

8. The epoxy resin formulation composition of claim 1, including a reactive diluent, a flexibilizing agent, a processing aide, a toughening agent or a mixture thereof.

9. The epoxy resin formulation composition of claim 8, wherein the reactive diluent is 1,4-butanediol diglycidylether; 1,6-hexanediol diglycidylether; trimethylolpropane triglycidylether; triglycidyl ether of propoxylated glycerine; epoxidized castor oil; epoxidized linseed oil; ortho-cresyl glycidyl ether, alkyl glycidyl ether; neopentyl glycol diglycidylether, or mixtures thereof.

10. The epoxy resin formulation composition of claim 1, wherein the epoxy resin formulation composition upon curing provides a cured product with a glass transition temperature of from about 140° C. to about 225° C.; wherein the epoxy resin formulation composition upon curing provides a cured product with a tensile strength of from about 80 MPa to about 250 MPa; wherein the epoxy resin formulation composition upon curing provides a cured product with a dielectric breakdown strength of from about 10 kV/mm to about 45 kV/mm; and wherein the epoxy resin formulation composition upon curing provides a cured product with a volume resistivity of from about $1 \times 10^{12}$ ohm-cm to about $1 \times 10^{19}$ ohm-cm.

11. A process for preparing an epoxy insulating material for electrical apparatus comprising the steps of:
 (i) providing a composition of claim 1;
 (ii) applying the composition of claim 1 to a substrate; and
 (iii) curing the substrate and composition to form an insulation material;
wherein the resulting insulation material has a balance of required properties including electrical, mechanical, and thermal properties required for a continuous operating temperature of greater than or equal to about 120° C.

12. A product made by the process of claim 11.

13. The product of claim 12, wherein the product is an insulation material, a potting material, or a casting material with a balance of properties including electrical, mechanical, and thermal properties required for an operating temperature of greater than or equal to about 120° C.

14. The product of claim 13, wherein the product is an electrical apparatus; and wherein the electrical apparatus is a power transformer.

15. A process for preparing a curable epoxy resin formulation composition as insulation for electrical apparatus comprising admixing (a) at least one liquid epoxy resin; (b) at least one liquid cyclic anhydride hardener; (c) at least one thermally conducting and electrically insulating epoxy-silane treated filler, and (d) at least one amine cure catalyst with no amine hydrogens; wherein the epoxy resin formulation composition upon curing provides a cured product with a balance of properties comprising a glass transition temperature of at least about 140° C., a tensile strength of at least about 80 MPa, a dielectric strength of at least about 10 kV/mm, a thermal conductivity of at least about 0.8 W/m-K, and a volume resistivity of at least about $1 \times 10^{12}$ ohm-cm.

* * * * *